June 20, 1944.  P. F. SEIBOLD  2,351,842
GEAR GRINDING MACHINE
Filed April 19, 1940  4 Sheets-Sheet 3

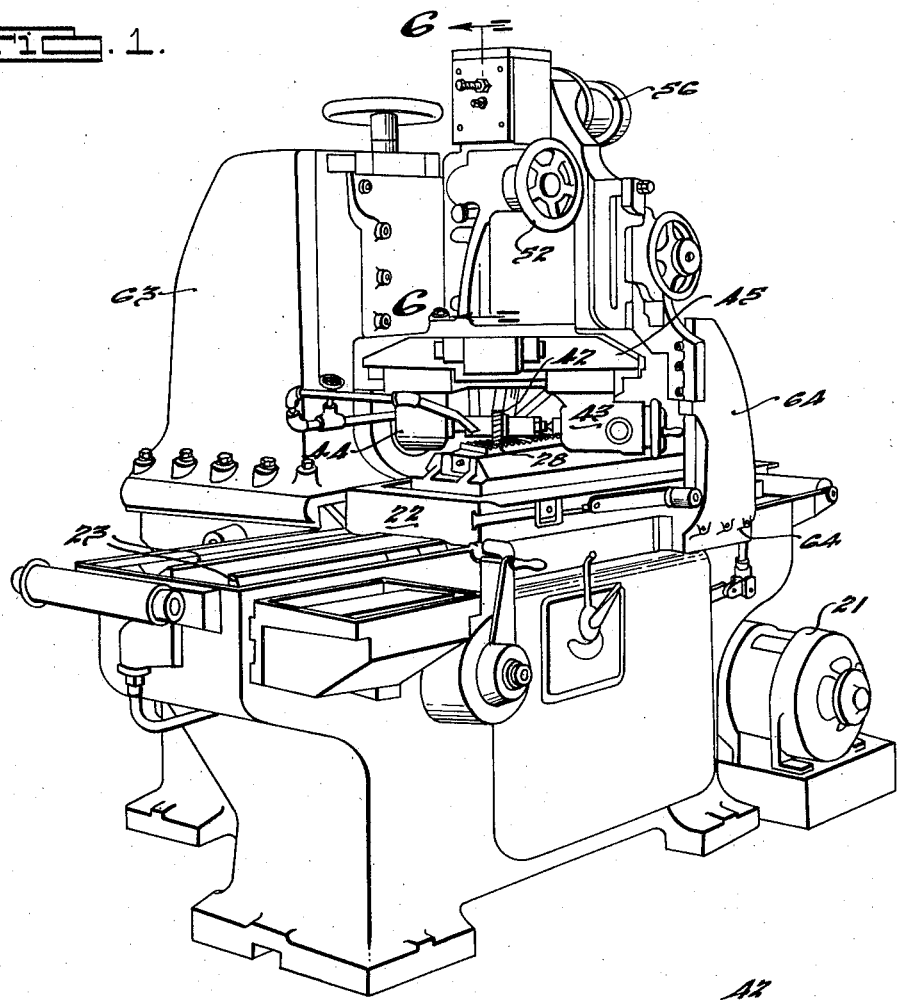

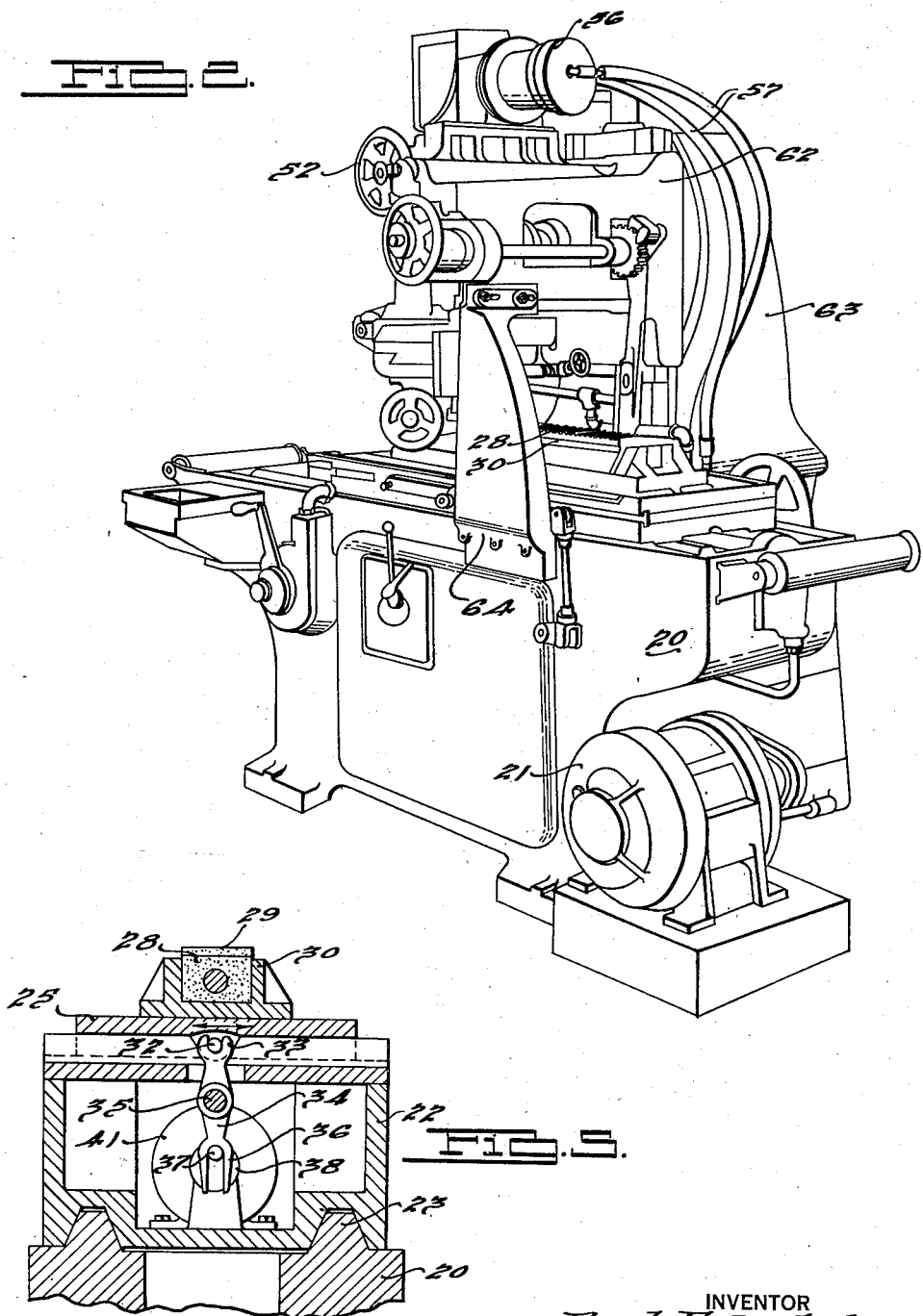

INVENTOR
Paul F. Seibold.
BY
Harness, Dickey & Pierce
ATTORNEYS.

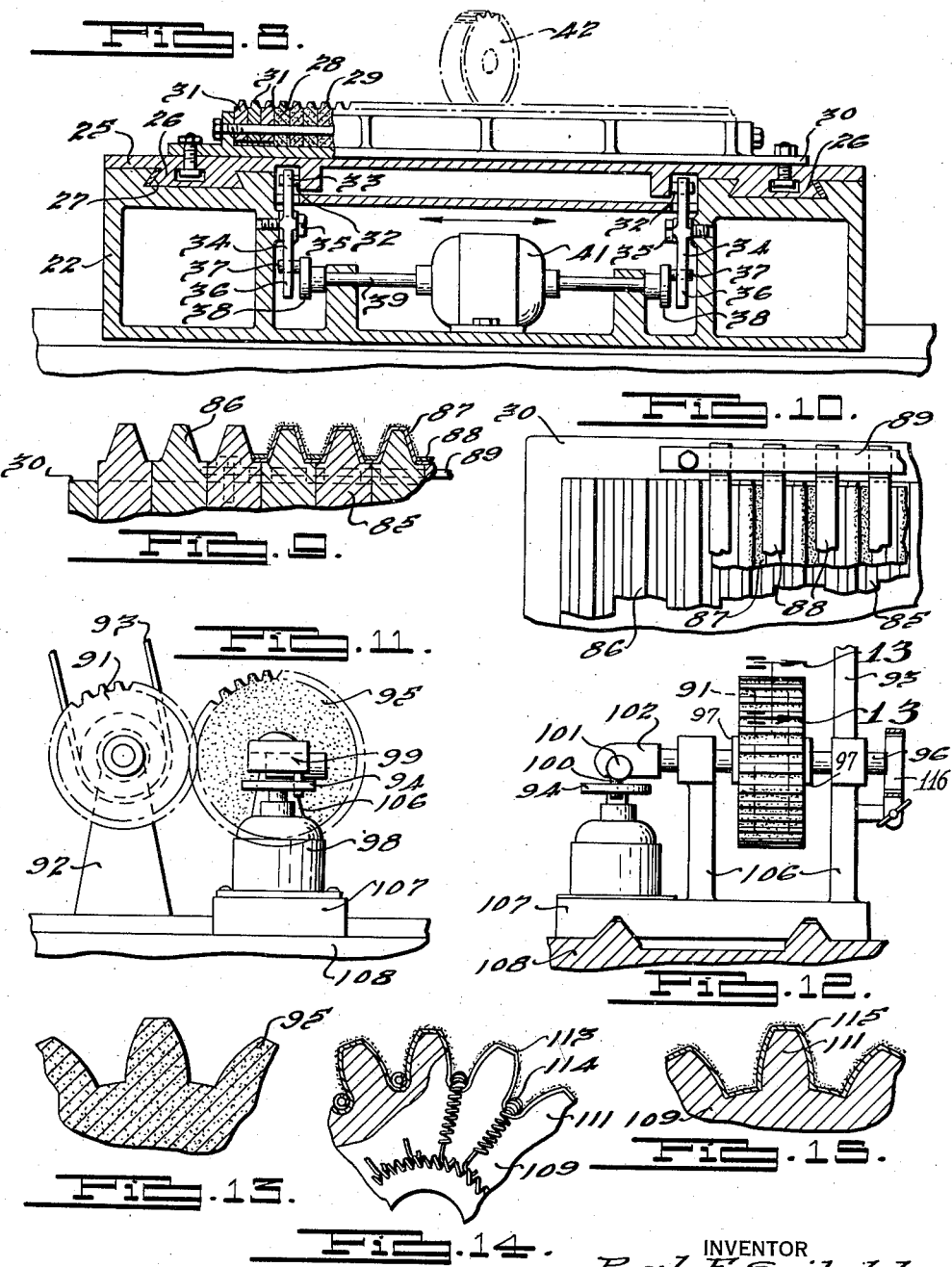

Patented June 20, 1944

2,351,842

UNITED STATES PATENT OFFICE 2,351,842

GEAR GRINDING MACHINE

Paul F. Seibold, Newport, Mich., assignor to Michigan Tool Company, Detroit, Mich., a corporation of Delaware Application April 19, 1940, Serial No. 330,570

14 Claims. (Cl. 51—69)

My invention relates to gear finishing machines, and particularly to a machine for finishing the hardened teeth of gears to accurate form with a high degree of finish.

This application is a continuation in part of my application, Serial No. 58,838, filed January 13, 1936. While the specific embodiment of the invention illustrated in the accompanying drawings, and described in the following specification is practically the same as that illustrated in the above-mentioned copending application, more detail is illustrated of the machine initially referred to in the above-mentioned application as being illustrated, described and claimed in the Patent to E. A. Overstedt, No. 2,254,240, issued September 2, 1941, and assigned to the assignee of the present invention. A particular movement of the table, in a direction onto which the vibratory movement of the tool was superimposed, was not clearly shown and described, although present in the machine.

Heretofore, hardened gears have been finished by a grinding or a lapping operation to provide a tooth structure which is of approximate form and a finish for the surface of the gear teeth. In the main, the lapping and grinding processes now in conventional use are not only slow and costly, but great difficulty has been encountered in producing consistent and accurate tooth forms, spacing and dimension. It is, therefore, a general object of the present invention to provide means for finishing gears which will be rapid, producing finished teeth having a configuration of desired tooth form, and of desired dimension, spacing and concentricity.

One embodiment of the present invention contemplates the provision of a rack formed of a plurality of grinding elements which present a tooth structure conjugate to the tooth structure to be produced on the finished gear. Means are provided for causing a relatively rapid vibration of the rack transversely of its longitudinal dimension while a gear to be finished is maintained in rolling engagement with the rack teeth which finish the teeth of the gear as they are advanced relative to each other. This lateral vibration occurs in a cycle of small length approximately equal to the width of the gear or less.

In another form, the present invention contemplates the provision of a circular grinding element having a tooth structure conjugate to the teeth of the gear to be finished. Means are provided for producing a transverse vibration between the gear-like grinding tool and a gear to be finished which is maintained in rolling engagement therewith. An additional movement in reciprocation is provided between the gear and tool to relatively traverse the gear and tool laterally of each other.

It is a general object of the present invention to provide a relatively rapid method of finishing gear teeth while obtaining an accurate tooth form.

Yet another object of the invention consists of the provision of apparatus for rapidly and accurately machining successive teeth of a gear and means for constantly maintaining the gear in rolling engagement with the finishing tool throughout the operation so that successive teeth on the gear may be serially finished.

Still another object of the invention consists of the provision of a machine for finishing gear teeth in which substantially the whole finishing operation is conducted by the vibration of the grinding element transversely of its plane of operation so that deformation of the tooth structure resulting from machining due to the roll of the gear will be virtually eliminated.

Other objects and features of novelty of my invention will be either specifically pointed out or will become apparent when referring, for a better understanding of my invention, to the following description taken in conjunction with the accompanying drawings, wherein:

Figure 1 is a perspective view of a machine embodying features of my present invention, taken from the front corner thereof;

Fig. 2 is a perspective view of structure illustrated in Fig. 1, taken from the rear corner thereof;

Fig. 3 is a broken view of the machine illustrated in Fig. 1, showing a modified form thereof;

Fig. 4 is a view of structure, similar to that illustrated in Fig. 1, showing a further form which my invention may assume;

Fig. 5 is a sectional view of the tool mounted on the ways of the machine illustrated in Figs. 1 and 2;

Fig. 8 is a longitudinal sectional view of the tool with parts in elevation and the driving mechanism therefor, as illustrated in Fig. 5;

Fig. 9 is a broken sectional view of structure, similar to that illustrated in Fig. 8, showing a modified form of my invention;

Fig. 10 is a broken plan view of the structure illustrated in Fig. 9;

Fig. 11 is a side view in elevation of finishing structure showing a further form which my invention may assume;

Fig. 12 is an end view of the structure illustrated in Fig. 11;

Fig. 13 is a sectional view of the structure illustrated in Fig. 12, taken on the line 13—13 thereof;

Fig. 14 is a broken view, partly in section, of a tool, showing a further form thereof; and, Fig. 15 is a view of structure, similar to that illustrated in Fig. 14, disclosing a still further form of tool for practicing my invention.

Figures 6, 7:
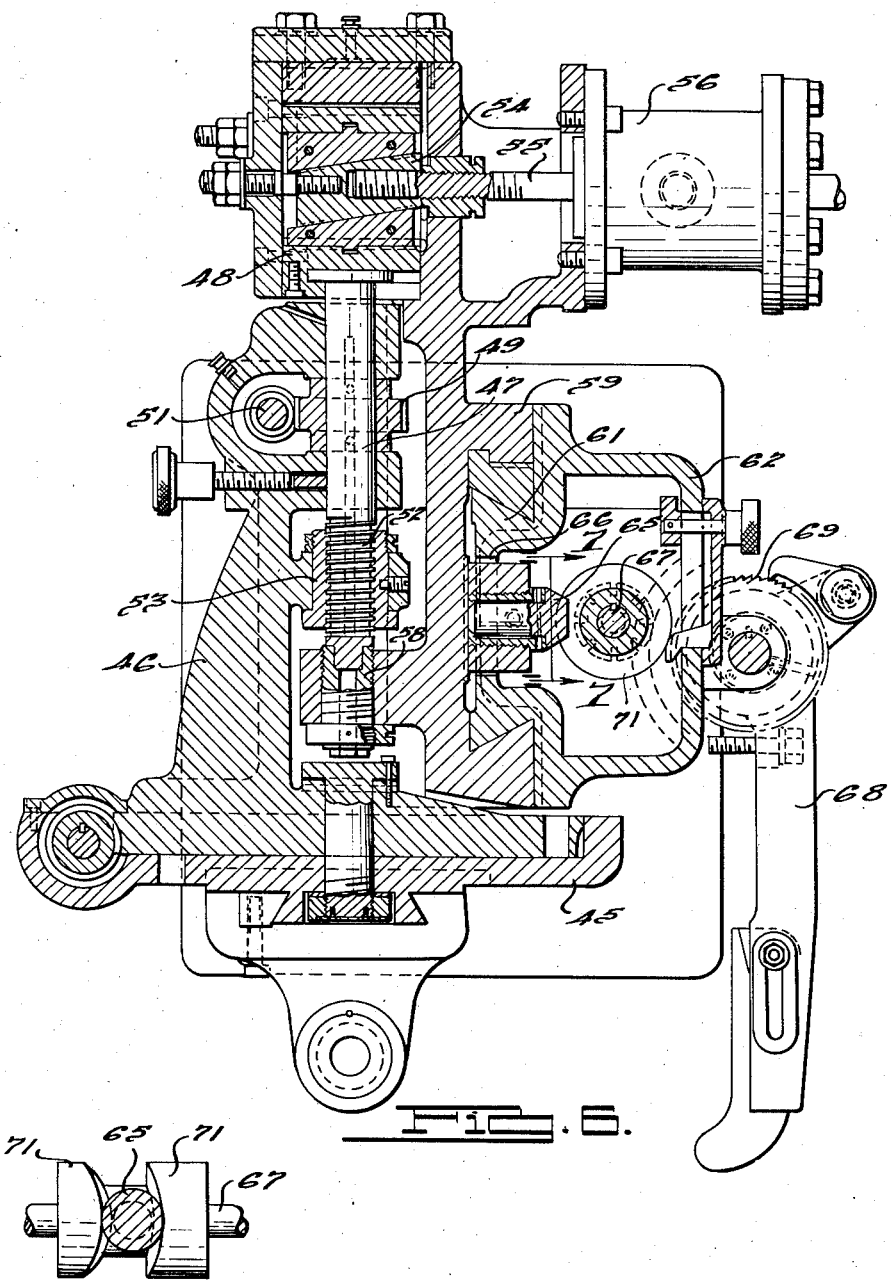
Fig. 6 is an enlarged sectional view of the structure illustrated in Fig. 1, taken on the line 6—6 thereof.
Fig. 7 is a sectional view of the structure illustrated in Fig. 6, taken on the line 7—7 thereof.

In Figs. 1 and 2, I have illustrated a gear finishing machine of the rack type which is similar to that illustrated and described in the above-mentioned E. A. Overstedt application. The machine in general embodies a bed 20 having therein oil gear mechanism (not shown) operated by an electric motor 21. The oil under pressure actuates a carriage 22 in reciprocation on ways 23 provided on the top of the bed 20. The carriage 22 is provided with a table 25 having laterally extending dove-tailed projections 26 which are received in dove-tailed slots 27 disposed laterally of the carriage 22. The table is provided with a blade holder 30 in which a plurality of individual blades 28 having teeth 29 on their upper ends are secured. The blades 28 are constructed of abrasive material, preferably of a fine hard grain, for reducing wear and for machining a high polish on the surface of the teeth of the gear being finished. Additional blades 31 may be provided at the loading end of the tool to prevent the chipping of the abrasive teeth 29 when a gear is mounted in the machine. It will be understood that the teeth are finished in an especially rapid manner and that the loading and unloading time must therefore be at a minimum in order to finish more than one gear per minute.

The table 25 is provided with longitudinally projecting pins 32 which are engaged by a forked end 33 of a link 34 which is pivoted on the bolts 25 to the carriage 22. The opposite end of the link 34 is provided with a bifurcated end 36 which projects over a pin 37 eccentrically mounted on a disc 38 which is driven by a shaft 39 from a motor 41. If a standard type of motor 41 is employed, operating at 1750 R. P. M., it will be noted that this will produce 3500 oscillations per minute to the teeth 29 of the tool. By employing motors of greater speeds the oscillation of the tool will be increased proportionately. Similarly, by changing the degree of eccentricity of the pin 37, or by changing the relation of the pivot 35 relative to its distance to the ends of the forked portions of the link the degree of oscillation may be controlled.

The problem confronting the gear manufacturers is one of machining the teeth of gears after hardening to return them to accurate form originally machined thereon before the hardening operation. While material advancement has been made in the art of finishing gears and of hardening metal, nevertheless an appreciable percentage of the gears after hardening were found to have changed their form due to the relieving of the strains set up by the machining of the teeth when soft, that is to say, before the hardening operation. The Overstedt machine herein referred to provided an accurate method of producing involute forms on teeth at the rate of two or more gears per minute. After the hardening operation the gears which had the teeth warped out of form required a lapping operation to return the teeth to approximate form. This required substantially three minutes for each gear because the lapping is a slow process. Further, the lapping process was employed more to machine high spots from the gear teeth flanks rather than for a generating method of producing an involute or other form. This is evident from the fact that a breaking operation was employed between the gear and lapping tool so that the lapping tool could be used after the teeth wore to extremely thin dimensions without any appreciable form remaining on their flanks.

Various methods were suggested for eliminating the slow inaccurate lapping process for finishing the hardened flanks of the gear. The present method was invented when attempting to provide a proper speed of movement to a grinding element while maintaining the teeth in meshed relation. It will be evident that when attempting to employ a large wheel having a plurality of teeth and utilizing a small section of the teeth as a rack that a mating capacity would never be obtained until the diameter of such a grinding element would reach infinity. The use of the rack, as herein illustrated, simulates the use of a section of a circular tool having a radius of infinity. However, instead of attempting to rotate such a rack to produce the proper surface speed, applicant has superimposed the vibratory motion of the rack upon the normal movement provided by the machine above-mentioned to thereby obtain the proper surface grinding speed for the tool.

The mere rolling movement of the teeth over the rack having the abrasive teeth 29 would produce only scratch marks and not a grinding operation. The lateral vibratory motion added to the rolling motion does produce the surface grinding speed necessary for intermingling the scratch marks so completely that an extremely fine finish is produced. By maintaining a cramping action between the teeth of the tool and those of the gears, a true involute form is produced on the teeth of the gear being machined. Not only, therefore, has applicant materially reduced the time required for finishing the teeth of hardened gears which are slightly out of form over that required in a lapping operation, but he has also provided a machine and method whereby a true involute form is redeveloped on the teeth which is not so developed by the lapping process.

Referring more specifically to Figs. 1 to 6 inclusive, the motions provided between the gear and tool and the operation of the machine will now be set forth in detail. As pointed out hereinabove, the carriage 22 is reciprocated longitudinally of the bed 20 on ways 23 producing a longitudinal movement to the rack teeth. It will be understood that the teeth may be disposed horizontally of such movement or at an angle thereto to simulate a spur or helical type of tool. The gear 42 being machined, is mounted by a headstock 43 and a tail-stock 44 carried by a head 45 that rotates about a vertical axis, permitting the teeth of the gear to be mated with those of the tool.

The head 45 is carried by a casting 46 which is mounted on a shaft 47, carried by a slide 48. A gear 49 is keyed to the shaft 47 driven by a worm 51 from a hand wheel 52. The adjustment of the hand wheel rotates the shaft 47 to have the threads 52 thereof operate in a bushing 53 which supports the casting 46 for vertical adjustment.

The slide 48 is operated vertically by a cam 54, moved by a rod 55 on a piston disposed within a cylinder 56. Conductors 57 admit fluid to the front or rear end of the cylinder for producing the movement to the cam 54. A feed movement for the gear is thereby provided for moving the gear downwardly into the teeth of the tool during the machining operation. A bushing 58 is contacted by the end of the shaft 47 for limiting the downward movement of the gear adjustable through the positioning of the bushing 58. In this manner, the machining operation is terminated when the proper radius of the gear is reached.

The slide 48 and cylinder 56 are supported on a slide 59 which is mounted on ways 61 on a head 62 of the machine which is supported by the column 63 and bracket 64. The slide 58 is provided with a roller 65 operating through a slot 66 in the head 62. A shaft 67 within the head 62 is driven in rotation by the operation of an arm 68 and ratchet wheel 69 through suitable gears, not herein illustrated. A cam 71 is carried by the shaft 67 in which the roller 65 projects to produce the movement of the roller 65 and therefore the slide 59 laterally of the machine during the machining operation on the gear 42. The arm 68 is oscillated by the carriage 22 near the end of its cycle in reciprocation.

It will thus be seen that the tool is moved longitudinally and rapidly vibrated laterally of such movement which lateral vibration may be parallel to the teeth 29 of the tool or at an angle thereto while the gear is moved downwardly and also laterally across the tool. The mounting for the gear is such that its axis may be adjusted at any angle to have the teeth thereof mate with the teeth of the rack which may be disposed at an angle to the longitudinal movement thereof. This angular disposition superimposes an oscillating movement to the gear teeth due to the lateral vibratory movement of the tool to further break up and intermingle the scratch marks produced by the roll of the gear, and the lateral movement of the gear relative to the tool, to thereby produce rapid machining and a highly polished finish.

Suitable control means is provided in the machine for producing the various movements and for regulating the time of operation of the machine. It has been pointed out hereinabove that the operation depends upon hydraulic mechanism, circuits, and suitable control valves, all of which are illustrated and described in detail in the above-mentioned copending application of E. A. Overstedt.

In Fig. 3, I have illustrated the machine of Fig. 1 as having the carriage 22 eliminated and the base 20 extended at 72 to support brackets 73 on which a gear supporting arbor 74 is mounted. A motor 75, operating through an eccentric 76, rapidly vibrates the tool 77 axially while driven in rotation by a motor 78 through suitable driving means enclosed in a housing 79. It will be noted in this arrangement that the same motions are provided for the rotary tool as in the machine having the rack tool illustrated in Fig. 1. The rotation of the circular tool simulates the movement of the rack in reciprocation while the vibratory movement is superimposed by the arbor supporting the tool. It will be noted also in this arrangement that the tool may have helical teeth which are disposed at an angle to the vibratory movement to provide the additional oscillation to the gear which thereby further intermingles the scratch marks on the gear teeth to produce more rapid cutting and a finer finish.

In Fig. 4, I have illustrated a master gear and tool operating in parallel with the tool and the gear being machined. The arbor 81 supporting the gear 42 also supports a master gear 82 of exact form to which the gear 42 is to be machined. A master gear element 83 which is similar to the rack or circular tool is mated with the master gear 82 and maintains mating capacity between the gear 42 being machined and the tool. After the finishing operation the gear 42 will be of the exact form and dimension as the master gear 82.

Referring to Figs. 9 and 10, I have illustrated a plurality of metal blades 85 which have the tooth ends 86 thinner than that required to mate with the teeth of a gear to be abraded. An abrading surface 87 is provided over the teeth 86 and is herein illustrated as being in the nature of an emery cloth which is stretched tightly over the teeth and retained by a plurality of cross members 88 secured to the tool frame 30 by longitudinally disposed members 89. In this manner, no dressing operation is ever required for the teeth, it being only necessary to remove the worn paper, cloth or similar abrasive retaining material and substitute new material therefor.

In Figs. 11 and 12, I have illustrated the precise method of abrading the teeth of gears after a hardening operation as effected by a rotary type of abrading tool. In Fig. 11 the hardened gear 91 to be ground is mounted on a support 92 and driven by suitable means, such as a belt 93. A circular gear-like abrading element 95 is mounted on a shaft 96 between collars 97 which permit the tool 95 to rotate on the shaft 96 and to be moved axially with the shaft as the shaft is reciprocated. The reciprocation is effected by a motor 98 operating through an eccentric 99 mounted between the shaft of the motor and the shaft 96.

The eccentric embodies a plate 94 carrying an externally disposed pin 100 on which a shaft 101 is supported. The pin 100 and shaft 101 are pivotally disposed relative to the plate 94 so that the shaft 101 can slide through the aperture in the housing 102 which is reciprocated as the plate rotates. The motor 98 and the shaft supporting brackets 106 are mounted on a carriage 107 adjustable on a bed 108 from and toward the work. This permits adjustment to obtain the proper depth of engagement between the teeth of the abrading tool and those of the gear.

A portion of the abrading tool 95 is illustrated in Fig. 13 to show that the tool is solid, made from abrading material such as carborundum, silica, and the like. In Fig. 14 I have illustrated a tool 109 made of fiber, metal or similar material having teeth 111 thereon of smaller dimensions than those which mate with the teeth to be machined. The teeth are covered by an element 113 carrying an abrasive and may be in the nature of an abrasive cloth, paper or the like. The element 113 is retained in fixed relation with the teeth 111 by suitable means herein illustrated as by springs 114 which draw the element 113 into intimate engagement with the teeth 111. In this tool, the form need never be dressed on the teeth, it being only necessary to change the element 113 when it becomes worn.

In Fig. 15, I have illustrated a tool 109 made of fiber, metal or other suitable material, having abrading material 115 cemented or otherwise adhered directly to the surface of the teeth 111. This material may be sprayed, molded or otherwise added to the face of the teeth to provide accurate involute or similar forms by producing a constant depth of material relative to the surface of the teeth. In a plastic state, after such an abrading material has been placed on the tool, it may be rolled on the teeth of a rack to cause the material to be spread to a uniform depth after which it is hardened to form an accurate tool. After the abrading material becomes worn, it may be removed and the process of adding the material repeated.

It was found that a large number of gears may be finished by the tools herein illustrated without the necessity of re-surfacing or dressing the tool. This is true in view of the fact that only slight abrading is contemplated on the hardened gears as only the distorted portions and high spots need be machined to return the gears, accurately finished when soft on the machine of the Overstedt application above-mentioned to original form.

When a circular gear-like tool, illustrated in Figs. 3, 10 to 15, is employed, it is advisable to select such tool with a greater or lesser number of teeth than that provided on the gear to be machined. This will provide a "hunting" action permitting different teeth of the tool to mate with different teeth of the gear during their relative advancement due to roll. The same effect may be obtained in the flat type of tool, as illustrated in Figs. 1 and 8, by periodically changing the position of the teeth of the gear with those of the tool.

A braking operation may also be employed to advantage when the tooth thickness of the tool is not maintained. Since the machining effected by the tool is uniform over the face of the teeth of the gear, uniform wear will occur on the face of the tool teeth. The tooth form will be maintained even though the tooth thickness is reduced. To avoid a dressing operation, it may be advantageous to employ a brake 116 to apply a load on the gear so that one side of the gear teeth only will be held in mesh with the teeth of the tool and a reverse operation will machine the opposite side.

The invention contemplates particularly the extremely rapid and accurate finishing of gear teeth after they are hardened and the elimination of a lapping operation. The gears are preferably machined to accurate form before hardening in a machine similar to that described hereinabove in the Ernest A. Overstedt application. Any distortion occurring to the teeth during the hardening process will be quickly removed by the device of the present method and any errors will be eliminated. The rapid transverse reciprocation of the tool produces machining laterally across the teeth which is uniform at the crown, root and pitch line and at all points therebetween. Since the rolling of the gear on the tool is very slight, only enough for indexing and feeding purposes, substantially no abrading action can be effected by such movement. As a result, an extremely accurate involute form is produced on the hardened tool irrespective of the amount of machining taking place. Due to the rapidity by which each of the gears may be accurately dressed by the method and machine herein described, the heretofore expensive and laborious operation of mating gears with each other in pairs and checking such gears for sound may be entirely eliminated since each and every gear must be perfect after being operated on by the abrading method herein described.

While I have described and illustrated several embodiments of my invention, it will be apparent to those skilled in the art that various changes, omissions, additions and substitutions may be made therein without departing from the spirit and scope of my invention, as set forth in the accompanying claims.

What I claim is:

1. In a gear finishing machine, a rotary tool having a series of teeth, the surfaces of which are formed from an abrading material, means for mounting a gear to be finished with its axis in crossed relation to the axis of said tool when the teeth thereof are in meshed relation, means for relatively rotating said gear and tool and means for relatively vibrating said tool substantially normal to the directions of rotation of the tool and gear at a speed to produce a grinding operation which is spread over the teeth of the flanks by said rotation.

2. In a gear finishing machine, a gear-like tool having teeth, the surfaces of which are formed of an abrading material, means for mounting a gear to be finished in mesh with the teeth of said tool, means for driving said tool and gear one by the other means for rapidly vibrating said tool transversely in a direction substantially parallel to the teeth thereof, and means for moving said gear and tool during said vibration substantially parallel to the axis of said gear.

3. In a gear finishing machine, an element having teeth conjugate to the teeth of a gear to be finished, the surfaces of said teeth being formed of an abrading material, means for rotatably mounting a gear to be finished in mesh with the teeth of said element, means for driving said gear and element one by the other means for causing rapid relative vibratory movement of said element and said gear laterally of the side of said gear at a speed sufficient to produce a grinding operation, and means for moving said gear and tool during said vibration substantially parallel to the flanks of said teeth.

4. In a gear finishing machine, a gear-like tool having teeth, the surfaces of which are formed of an abrading material, means for rotatably mounting a gear to be finished in mesh with the teeth of said tool, means for causing relative rapid vibratory movement of said tool and said gear laterally of the side of said tool at a speed sufficient to produce an abrading operation, means for causing rotary movement of said gear whereby the teeth thereof are brought successively into engagement with the teeth of said tool solely as a feed movement, and means for moving said gear and tool during said vibration substantially parallel to the axis of said gear.

5. In a gear finishing machine, a gear-like tool having teeth, the surfaces of which are formed of an abrading material, means for rotatably mounting a gear to be finished in mesh with the teeth of said tool, means for relatively vibrating said tool and gear at a rapid rate parallel to the axis of the gear, means for causing rotation of said gear to bring successive teeth thereof into engagement with the teeth of said tool, and means for moving said gear and tool during said vibration substantially parallel to the direction of said vibration.

6. In a gear finishing machine, a tool having a series of teeth, the surfaces of which are formed from an abrading material, means for rotatably mounting a gear in mesh with the teeth of said tool, means for relatively vibrating said tool and gear substantially normal to the plane of rotation of the gear, means for rotating said gear while in mesh with the tool to bring successive teeth thereof into engagement with said tool teeth, and means for moving said gear and tool during said vibration substantially parallel to the direction of said vibration.

7. In a gear finishing machine, a gear-like tool having teeth, the surfaces of which are capable of producing an abrasive operation, means for rotatably mounting a gear to be finished in mesh with the teeth of said tool, means for causing relative rapid vibrating movement of said tool and said gear transversely of each other, and means for causing rotary movement of said gear in addition to said vibrating movement whereby the teeth thereof are brought successively into engagement with the teeth of said tool, the mounting of said gear and tool being such that the sides thereof are disposed at an angle to each other so that said vibrating movement produces a vibratory oscillation to said gear about its axis superimposed upon the rotation thereof.

8. In a gear finishing machine, a gear-like tool having abrading teeth and being of greater width than a gear to be ground, means for relatively feeding said tool into contact with the gear, means for relatively vibrating said tool and gear through a short cycle of reciprocation laterally of each other, means for relatively rolling said gear and tool to advance the teeth theerof, and means for relatively moving said gear and tool substantially parallel to the direction of movement in vibration to have the end portions of the teeth of the tool engage the teeth of the gear.

9. In a gear finishing machine, a gear-like tool having abrading teeth and being of greater width than a gear to be ground, means for relatively feeding said tool into contact with the gear, means for relatively vibrating said tool and gear through a short cycle of reciprocation laterally of each other, means for relatively rolling said gear and tool to advance the teeth thereof, and means for relatively moving said gear and tool substantially parallel to the direction of movement in vibration to have the end portions of the teeth of the tool engage the teeth of the gear, said means for producing the movement in vibration being independent of the means for rolling the gear and tool whereby their speeds of operation may be varied.

10. In a gear finishing machine, a gear-like tool having the surfaces of which are formed of an abrading material, means for mounting a gear to be finished in mesh with the teeth of said tool, a master gear set having the same dimensions as said gear and tool to which the set is coupled, and means for rapidly vibrating said tool and one of said master gears transversely in a direction substantially parallel to the teeth thereof.

11. In a gear finishing machine, a gear-like tool having teeth the surfaces of which are formed of an abrading material, means for mounting a gear to be finished in mesh with the teeth of said tool, a master gear set having the same dimensions as said gear and tool to which the set is coupled, means for rapidly vibrating said tool and one of said master gears transversely in a direction substantially parallel to the teeth thereof, and means for relatively feeding said gear and tool and said master gear set transversely during said vibration.

12. In a gear finishing machine, a gear-like tool having teeth the surfaces of which are formed of an abrading material, means for mounting a gear to be finished in mesh with the teeth of said tool, a master gear set having the same dimensions as said gear and tool to which the set is coupled, and means for rapidly vibrating said tool and gear and said gear set relative to each other transversely in a direction substantially parallel to the teeth thereof while said gear and one of said master gears is retained in fixed relation to each other and said tool and the other of said master gears is similarly retained in fixed relation.

13. In a gear finishing machine, a gear-like tool having teeth the surfaces of which are formed of an abrading material, means for mounting a gear to be finished in mesh with the teeth of said tool, a master gear set coupled with said gear and tool, means for rapidly vibrating said tool and gear and said gear set relative to each other transversely in a direction substantially parallel to the teeth thereof while said gear and one of said master gears is retained in fixed relation to each other and said tool and the other of said master gears is similarly retained in fixed relation, and means for relatively feeding said gear and tool and said master gear set transversely during said vibration.

14. In a gear finishing machine, a reciprocable rack having a series of flat sided teeth made of abrasive material which mesh with the teeth of curved form on a gear to be finished, means for rotatably mounting a gear to be finished in mesh with the teeth of said rack, means for causing vibration of said rack normal to its path of reciprocation at a speed to produce a grinding operation, means for producing the rotation of said gear to bring successive teeth thereof into engagement with the teeth of said rack and means for moving said gear laterally across said rack in the direction of said vibration.

PAUL F. SEIBOLD.

CERTIFICATE OF CORRECTION.

Patent No. 2,351,842.                                          June 20, 1944.

PAUL F. SEIBOLD.

It is hereby certified that error appears in the printed specification of the above numbered patent requiring correction as follows: Page 5, first column, line 53, claim 10, after the word "having" insert --teeth--; and that the said Letters Patent should be read with this correction therein that the same may conform to the record of the case in the Patent Office.

Signed and sealed this 22nd day of August, A. D. 1944.

Leslie Frazer (Seal)                            Acting Commissioner of Patents.